United States Patent [19]

Ookawa

[11] 4,303,306

[45] Dec. 1, 1981

[54] LENS ASSEMBLY

[75] Inventor: Kaneyas Ookawa, Tokyo, Japan

[73] Assignee: Olympus Optical Co., Ltd., Japan

[21] Appl. No.: 126,660

[22] Filed: Mar. 3, 1980

[30] Foreign Application Priority Data

May 31, 1979 [JP] Japan .......................... 54/74288[U]

[51] Int. Cl.³ .............................................. G02B 7/02
[52] U.S. Cl. ........................... 350/252; 285/DIG. 22; 350/257
[58] Field of Search ....................... 350/242, 252–253, 350/257; 285/DIG. 22; 403/DIG. 4; 354/286; 356/252, 257

[56] References Cited

U.S. PATENT DOCUMENTS

| 870,535 | 11/1907 | Bausch | 350/253 |
| 3,777,137 | 12/1973 | Costanzo et al. | 350/252 |
| 3,942,226 | 3/1976 | Barnett et al. | 350/252 |
| 3,950,014 | 4/1976 | Doubleday | 285/DIG. 22 |
| 4,111,530 | 9/1978 | Fuehrer et al. | 350/252 |

FOREIGN PATENT DOCUMENTS

| 616567 | 7/1935 | Fed. Rep. of Germany | 350/252 |
| 430551 | 10/1911 | France | 350/257 |
| 52-38235 | 3/1977 | Japan | 350/252 |

Primary Examiner—William H. Punter
Attorney, Agent, or Firm—Ostrolenk, Faber, Gerb & Soffen

[57] ABSTRACT

A lens assembly includes a barrel, the internal surface of which is formed with a lens abutment against which the peripheral edge of the front surface of a lens is supported. The free end of a preferably flexible lens fixing member is disposed to exert pressure on the peripheral edge of the rear surface of the lens, and its rear end is engaged with the barrel to fix the lens in position.

8 Claims, 3 Drawing Figures

LENS ASSEMBLY

BACKGROUND OF THE INVENTION

The invention relates to a lens assembly.

When mounting a lens into a lens barrel to fix it therein, the barrel is either internally or externally threaded and is threadably engaged by a retaining ring, which is tightened to a suitable degree to fix the lens by bearing against a peripheral region thereof. Unless the ring bears against the lens with a uniform force throughout the lens periphery, the lens may be oblique relative to the barrel. This may prevent a firm fixing, or a distortion may be produced in the lens as a result of greater force being applied to one part of the lens periphery than to the rest thereof, causing the performance of the lens system to be degraded. To prevent such degradation, both the barrel and the ring must be threaded or tapped in a positive manner so that the ring bears against the lens with a uniform force. However, performing a tapping operation with sufficient accuracy or tightening the retaining ring with a suitable pressure is a troublesome operation which requires a number of operating steps.

SUMMARY OF THE INVENTION

It is an object of the invention to eliminate the described disadvantage of the prior art by providing a lens assembly including a lens fixing member formed of a flexible material which is adapted to be inserted into a barrel so that its free end bears against a lens while its other end is engaged with a detent formed on the barrel, thus holding and fixing the lens within the barrel.

In accordance with the invention, a flexible lens fixing member has its free end disposed in abutment against the peripheral surface of a lens while its other end is engaged with the detent, thus utilizing the elasticity of the lens fixing member in order to fix the lens in position. No use is made of threads, while this method permits the lens to be fixed within the barrel by merely pushing the lens fixing member into the barrel in a very simple manner. Consequently, the troublesome operation of tightening a lens retaining ring the proper amount is dispensed with, simplifying the assemblying operation.

The machining of the barrel is also simplified since it is only necessary to provide it with a detent rather than forming threads therein. Any misalignment or skewing of the threads which may result in an unsatisfactory fixing of the lens or a distortion of the lens is avoided.

DESCRIPTION OF PREFERRED EMBODIMENT

Figure 1:
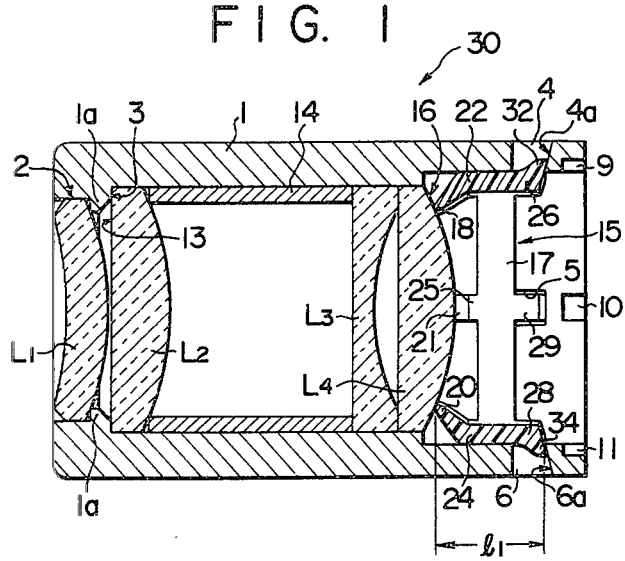
FIG. 1 is a cross section of a lens assembly according to one embodiment of the invention.

Referring to FIG. 1, there is shown a lens assembly 30 which comprises a barrel 1, a plurality of lenses $L_1$–$L_4$ which are fitted into the barrel 1, a fixing member 15 which is used to fix the lenses $L_2$, $L_3$ and $L_4$, and a spacer ring 14 disposed intermediate the lenses $L_2$ and $L_3$.

The barrel 1 has a cylindrical configuration, and a front portion thereof which is located toward the left-hand end, as viewed in FIG. 1, is internally formed with a lens holder 2 and is also formed with a projection 1a which is located adjacent to the lens holder 2. The lens $L_1$ is fitted into the lens holder 2 and is secured therein as by adhesion. The front end of the projection 1a bears against the peripheral edge of the rear surface of the lens $L_1$.

The rear surface of the projection 1a defines a lens abutment 3, and the lens $L_2$ has the peripheral edge of its front surface 13 disposed in abutment against the lens abutment 3. The rear surface of the lens $L_2$ is peripherally engaged by the front end of the spacer ring 14, the rear end of which is disposed in abutment against the front surface of the lens $L_3$ in its peripheral region. The lens $L_3$ is a concave lens and has a concave rear surface, the peripheral edge of which is formed into a flat configuration. The flat peripheral edge of the lens $L_3$ is disposed in abutment against the peripheral edge of the front surface of the convex lens $L_4$.

Figure 2:
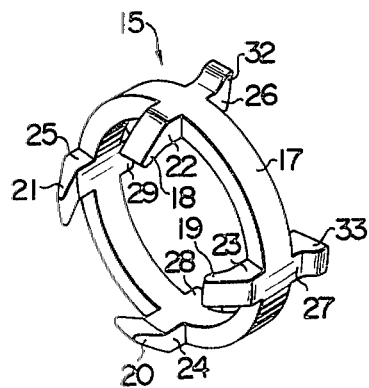
FIG. 2 is a perspective view of a lens fixing member used in the assembly shown in FIG. 1.
Figure 3:
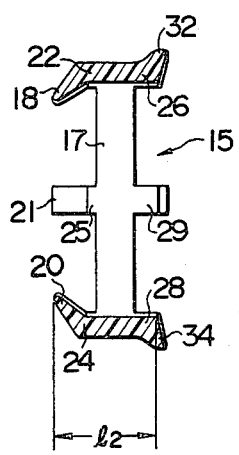
FIG. 3 is a cross section of the lens fixing member shown in FIG. 2.

The lens $L_4$ has a rear surface 16, the peripheral edge of which is disposed in abutment against the front end of inclined abutments 18–21 (see FIG. 2) of the lens fixing member 15 which is annularly shaped. Referring to FIGS. 2 and 3 which more closely illustrate the lens fixing member 15, it comprises an annular body portion 17, forward projections 22–25 which are disposed to project forwardly from the front surface of the annular portion 17 at an equi-angular spacing, and rear projections 26–29 projecting from the rear surface of the annular portion 17 and axially aligned with the forward projections 22–25. The free end of the forward projections 22–25 extend in an oblique direction toward the center, defining the inclined abutments 18–21. The outer surface of the rear projections 26–29 extend in a centrifugal direction or radially outward, defining engaging pieces 32–35 (engaging piece 35 not shown).

The lens fixing member 15 thus configured is formed of a flexible material such as plastic. When the lens fixing member 15 is inserted into the barrel 1 from its rear end, as shown in FIG. 1, the free end of the inclined abutments 18–21 can be brought into abutment against the peripheral edge of the rear surface 16 of the lens $L_4$.

Toward the rear end, the barrel 1 is formed with four openings 4–7 (opening 7 not shown) which are located in alignment with and are engaged by the rear projections 26–29 extending from the lens fixing member 15 as the latter is inserted into the barrel 1. These openings have bevelled rear surfaces 4a–7a (surface 7a not shown) which serve as detents 4a–7a.

Representing the spacing between the inner end of the detents 4a–7a and the point of abutment of the free end of the inclined abutments 18–21 against the peripheral edge of the lens $L_4$ by $l_1$ as indicated in FIG. 1, and representing the spacing between the free end of the inclined abutments 18–21 and the inner end of the rear projections 26–29 by $l_2$ as shown in FIG. 3, the design is made such that $l_1 < l_2$. Thus, the spacing $l_2$ is greater than the spacing $l_1$, so that when the lens fixing member 15 is simply inserted into the barrel 1, the engaging pieces 32–35 cannot be fitted into the openings 4–7, and the member comes to a stop short of a position where such fitting engagement is achieved, with its engaging pieces 32–35 deflexed inwardly by the internal surface of the barrel 1, together with the rear projections 26–29.

The lens fixing member 15, the free end of whose inclined abutments 18–21 have been brought into abutment against the peripheral edge of the lens $L_4$, can be further pushed into the barrel 1 by the application of an external force, whereupon the flexibility of the material from which the lens fixing member 15 is formed permits the fixing member 15, in particular its inclined abutments 18–21, to be flexed, allowing a further forward movement of the lens fixing member 15. As a consequence, the engaging pieces 32–35 move forward and can be fitted into the openings 4–7 by snap action as a result of the resilience of the rear projections 26–29 which permits the flexed projections to return to their original positions. When the external force is then removed, the lens fixing member 15 tends to return from its flex condition, permitting the engaging pieces 32–35 to be maintained in abutment against the detents 4a–7a to be locked thereby. Because the spacing l$_2$ is greater than the spacing l$_1$, the lens L$_4$ is now maintained in its forwardly biased condition when it is locked.

The rear end of the barrel 1 is internally formed with recesses 9–12 in alignment with the openings 4–7, respectively. The purpose of these recesses 9–12 (recess 12 not shown) is to enable the engaging pieces 32–35 on the lens fixing member 15 to be circumferentially located into alignment with the openings 4–7 as the lens fixing member is inserted into the barrel 1. Thus, when inserting the lens fixing member into the barrel 1, the engaging pieces 32–35 are initially aligned with recesses 9–12 before the member is further inserted into the barrel in order to assure a positive engagement of the engaging pieces 32–35 with the openings 4–7.

It will be noted that when the engaging pieces 32–35 are engaged with the detents 4a–7a in abutting relationship, the inclination of the detents 4a–7a outwardly and toward the rear end is effective to prevent the disengagement of the engaging pieces 32–35 from the detents 4a–7a. When the engaging pieces 32–35 are locked by the detents 4a–7a, and the resilience which is supplied by the flexibility in the lens fixing member 15 causes the lens L$_4$ to be directly urged, such resilience is further transmitted through the lens L$_3$, spacer ring 14 and lens L$_2$ to the lens abutment 3 associated with the projection 1a, whereby all of the lenses L$_2$, L$_3$ and L$_4$ and the spacer ring 14 are held between the lens abutment 3 and the lens fixing member 15 and fixedly maintained within the barrel 1. When the components are so assembled, an adhesive may be injected into the openings 4–7 to firmly secure the engaging pieces 32–35 therein.

In the embodiment described above, the inclined abutments 18–21, the engaging pieces 32–35 and the openings 4–7 associated with the latter are four in number. However, it should be noted that the number of these parts need not be limited to four, the fundamental requirement being that there be at least three of these elements at an equiangular spacing in the circumferential direction to assure that the lenses be fixed in position by a uniform force.

Also it should be noted that the configuration of the lens fixing member is not limited to that shown in FIGS. 1 to 3, but may comprise a flexible hollow cylinder having a plurality of axially extending slits formed in its opposite ends, with the inclined abutments and the engaging pieces being formed to be contiguous circumferentially.

What is claimed is:

1. A lens fixing member for a lens assembly of the type comprising a lens housing having an interior surface, and at least one lens accommodated in said housing and held in place therein by said lens fixing member, said lens fixing member being formed of a flexible plastic material and comprising:
   a generally cylindrical body having an axis and having a first and a second end;
   a first group of projections integral with and circumferentially approximately equally spaced about said body, and oriented to extend in a first axial direction and to project axially beyond said first end of said body in said first axial direction for engaging one surface of a lens; and
   a second group of projections integral with said body, equal in number to and axially aligned with respective ones of said first group of projections, and oriented to extend generally in a second axial direction opposite said first axial direction for engaging the interior surface of said housing.

2. The lens fixing member of claim 1, wherein each of said projections of said first group of projections comprises a lens abutment piece extending axially in said first axial direction and obliquely toward said axis of said body.

3. The lens fixing member of claim 1, wherein each of said projections of said second group of projections comprises an engagement piece extending axially in said second axial direction and obliquely away from said axis of said body, for engaging said interior surface of said housing.

4. A lens assembly comprising:
   (A) a barrel for housing a lens;
   (B) support means for supporting one end of a lens in said barrel;
   (C) a lens having a first end and a second end, said first end of said lens being supported by means of said support means;
   (D) a flexible, plastic lens fixing member having a first end and a second end and including:
      (1) a generally cylindrical body having an axis and having a first and a second end;
      (2) at least three first projections integral with and circumferentially approximately equally spaced about said body, and oriented to extend generally parallel to said axis in a first axial direction and to project axially beyond said first end of said body in said first axial direction for engaging one surface of a lens; and
      (3) a second plurality of projections integral with said body, equal in number to and axially aligned with respective ones of said first plurality of projections, and oriented to extend generally parallel to said axis in a second axial direction opposite said first axial direction for engaging the interior surface of said housing; and
   (E) said lens fixing member being disposed in said barrel and said first end of said lens fixing member snugly engaging said second end of said lens; and a plurality of detents formed in said barrel, each of said second plurality of projections engaging a respective said detent.

5. The lens assembly of claim 4, wherein said first end and second end of said lens fixing member are, respectively, nearer said first and second ends of said body, and wherein the axial spacing between said first and second ends of said lens fixing member is greater than the axial spacing between said first end of said lens fixing member and said detent means.

6. The lens assembly of claim 4, wherein said barrel has an interior surface and each of said detents comprises an aperture formed in said interior surface.

7. The lens assembly of claim 6, wherein each of said apertures has a peripheral wall beveled at an angle radially outward and in said second axial direction, said peripheral wall engaging a respective one of said second plurality of projections.

8. The lens assembly of claim 4, wherein said barrel has a guide recess for receiving said lens fixing member when said lens fixing member is inserted into said barrel, for guiding said second plurality of projections into engagement with said detents.

* * * * *